J. H. HOBART & J. T. BEST.
Ore Washer and Amalgamator.
No. 207,870. Patented Sept. 10, 1878.
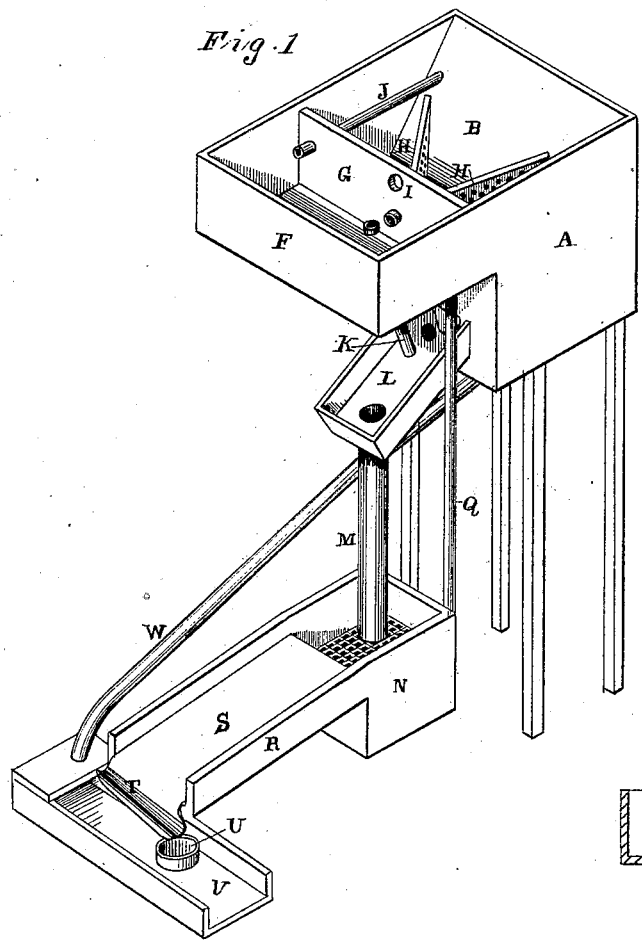
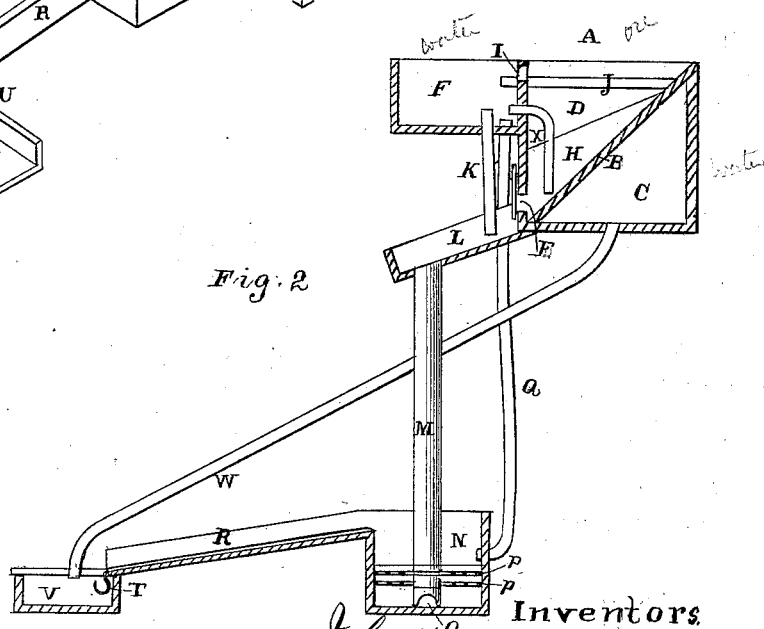
Witnesses
Geo. H. Strong
Frank A. Brooks
Inventors
John H. Hobart
John T. Best
by Dewey & Co.
Att'ys

UNITED STATES PATENT OFFICE.

JOHN H. HOBART, OF OAKLAND, AND JOHN T. BEST, OF SAN FRANCISCO, CALIFORNIA.

IMPROVEMENT IN ORE WASHER AND AMALGAMATOR.

Specification forming part of Letters Patent No. 207,870, dated September 10, 1878; application filed June 22, 1878.

*To all whom it may concern:*

Be it known that we, JOHN H. HOBART, of Oakland, county of Alameda, and State of California, and JOHN T. BEST, of the city and county of San Francisco, and State of California, have invented an Improved Amalgamator; and we do hereby declare the following to be a full, clear, and exact description thereof, reference being had to the accompanying drawings.

Our invention relates to certain improvements in that class of amalgamators in which the ore, sand, pulp, or tailings are allowed to pass through a feed-pipe and become discharged and distributed within and beneath a body of mercury within a tank, from which it may pass over a series of plates or riffles, and for which a patent was issued to John H. Hobart and C. H. Stward, May 21, 1878.

It consists in a novel combination of apparatus and in the employment of streams of water, which are discharged into the apparatus at different points, so as to loosen up the sand and prevent its becoming hard and caked, thus choking up the apparatus.

It also consists in introducing a body of sand into a distributing-tank with an excess of water, which excess of water is drawn off into storage-tanks, while an excess of sand is drawn from the tank and passed through the mercury-chamber and over the riffles, and the excess of water is employed, as before described, to loosen up and prevent the sand from choking or becoming massed, as will be more fully described by referring to the accompanying drawings, in which—

Figure 1 is a perspective view of our apparatus. Fig. 2 is a sectional elevation.

Let A represent a receiving and distributing tank, mounted on suitable frame-work, so as to be elevated above the ground. This tank may be made of considerable length to supply many machines. An inclined partition, B, separates this tank into two compartments or tanks, as shown, or separate tanks may be used. The lower compartment, C, is intended for water only, while the upper one, D, is used for containing the pulverized ore, black sand, or other material containing valuable metals, a considerable excess of water being introduced at the same time that the sand, &c., is, so that the material will flow rapidly. On the inclined partition or floor B of the receiving-tank D are two or more vertical perforated diaphragms or partitions, H, extending from the inclined floor to the front side of the tank, as shown, and dividing the tank D into as many compartments as may be desired for the number of machines to be fed from this tank. These diaphragms or partitions, from the manner in which they are arranged in the tank, prevent the black sand or other material under treatment from packing or becoming massed so closely as not to flow readily, and also act in directing the flow of material toward the discharge opening E in the front lower portion of the tank. Attached to the front of or mounted near the tank A is a water-tank, F, the bottom of which is placed somewhat above the bottom of the main tanks. A pipe, X, passes through the partition G between the receiving and water tanks, its lower end terminating near the lower edge of the inclined floor of the receiving-tank between the two diaphragms H and in front of the discharge-gate E, or is otherwise arranged to bring a supply of water to this point. An opening, I, near the top of said partition G, allows any surplus of water which may enter the receiving-tank D to flow into the water-tank. A pipe, J, passes through the partition G, the tank D, and inclined floor of said tank D into the compartment C, through which water is allowed to flow from the main water-tank into the lower water-compartment, C, for the purpose hereinafter described. A pipe, K, leads from the bottom of the water-tank F, and discharges into the upper part of the spout L, which is placed in front of the discharge-gate E. This pipe K has its lower end opening immediately in front of said gate, so as to assist the flow, and prevent the packing of the material passing from the receiving-tank into the inclined spout L by providing an extra supply of clear water at that point.

Near the lower end of the inclined spout L is placed a vertical tube, M, which extends down into a chamber or vessel, N, which is partly filled with mercury. The tube M extends down through this mercury, and its lower end or foot is notched or serrated, as shown at O, so as to facilitate the escape of the material passing down the tube into the mercury, and insure its thorough distribution through the mercury in the chamber N and surrounding the pipe. One or more screens, P, are placed across this chamber, above the end of the pipe, which have the effect of breaking up any lumps or masses of pulp or sand which may come out through the pipe, and also overcome the tendency of the mercury to crowd the sand together and lift it to the surface of the mercury in a mass, as shown in the patent to Hobart and Stward.

A pipe, Q, extends from the water-tank F down into the mercury-chamber, discharging an excess of clean water on the surface of the mercury, so as to stir the pulp or sand up and prevent its packing at that point or carrying off mercury, by reason of its mechanical entanglement with the sand, the point where this class of machines are most apt to fail.

After the pulp or sand is passed through the body of mercury by means of the pipe M it rises in the mercury-chamber to the surface of the mercury, and passes or is washed out of the chamber by the excess of water supplied by the pipe Q through the inclined sluice R, which is provided with riffles or an amalgamated plate, S. At the lower end of this sluice R the amalgamated plate is turned down over the edge and turned back again, so as to form a trough or gutter, T, set inclined, as shown, so as to lead toward the amalgam-box U. As the material passes over the amalgamated plate in the inclined sluice the water carries the material over into the waste or tailings sluice V, shooting it clear of the mercury-trough T, while any particle of mercury or amalgam will cling to and roll over the edge of the plate into the inclined trough or gutter T, and are by it conducted to the amalgam-box U, whence they may be removed at leisure.

In order to keep the waste or tailings sluice clear in front of the inclined sluices, so that the tailings will not bank up against the trough, a pipe, W, leads into the upper end of this tailings-sluice from the tank C, the water coming in through said pipe stirring up and carrying off said tailings.

The operation of our device is as follows: The pulp or black sand mixed with an excess of water is pumped or led into the receiving-tank D, the inclined flow of which leads the sand or pulp toward the discharge-gate E. Any surplus water in the upper part of this tank will separate from the heavy sand and flow through the opening I in the partition G into the water-tank F or C, so that it may be utilized. A cock on the pipe X is then turned, and water allowed to flow through said pipe into the bottom of the tank D, while at the same time the discharge-gate E is opened. The sand then flows through this gate into the spout L, the water flowing through the pipe X stirring up the sand and assisting its flow, thus keeping the gate free. The sand is prevented from packing in the receiving-tank in front of the gate by the stream of water referred to, and also by the peculiar diaphragms or partitions H. These diaphragms are perforated, and allow the sand to pass slowly through without letting it come in lumps or masses large enough to clog the gate, so that the stream of water from the pipe X will be able to keep what material there is in front of the gate stirred up sufficiently to keep it in a flowing condition. The gate may be made to operate automatically by means of floats, so as to allow the discharge of only a certain quantity of sand.

After the sand gets through the gate onto the spout L it meets a stream of water from the pipe K, which connects with the water-tank. This stream prevents the sand from settling in the spout, and also adds more water to the pulp at this point, so that it will freely pass down the tube M. The gravitation of the sand is sufficient to carry it down to the bottom of the tube M and under the mercury, it passing out of the tube through the orifices in the peculiarly-shaped foot O of the pipe M. As the pulp rises through the mercury in the chamber N it is forced to pass through the screens P, the meshes of the different ones being arranged diagonally to each other when more than one is used, so as to more effectually break up and separate any lumps of ore which may have a tendency to rise to the surface without being properly distributed. A stream of water from the pipe Q meets the pulp at this point, and prevents it from clogging on the surface of the mercury, keeping it agitated, so that it will flow freely over the amalgamated plates S in the sluice R. Whatever amalgam or mercury may be washed out of the mercury-chamber is caught by the trough or gutter T and led to the amalgam-box U, as hereinafter described. As the tailings reach the tailings-sluice V another stream of water from the pipe W, connecting with the tank C, meets them and keeps them in a state of agitation sufficient to prevent any clogging or banking up in said sluice.

Suitable cocks are placed in all the pipes mentioned, for controlling the supply of water at different points in accordance with the quality of the material under treatment.

It will be seen that the feed-tanks for both water and pulp or sand may be extended, so as to supply any number of machines, suitable pipes being connected at proper distances. In this manner large quantities of ore or sand may be treated at the same time, and it need not be forced through one machine so rapidly as to be liable to clog or bank up.

The auriferous black sands of the beaches of California and Oregon are, from their great specific gravity, apt to pack in places, so as to clog any apparatus for treating them, and this has been a principal cause of failure in the employment of machines for separating the gold, in addition to the extreme fineness of the gold; but we have provided supplemental streams of clear water at all points where packing is liable to occur, so as to prevent any possibility of packing.

By the method employed the sands are passed through the mass of mercury, so that no light floating particles of gold can escape the mercury, and a very thorough amalgamation is effected, while at the same time no loss of mercury or amalgam occurs by their being carried up and out by the mechanical entanglement with the mass of heavy sand, which is always ready to separate from the water and settle, packing very solidly when left quietly for a moment.

The important feature of our invention is the alternate enlivening or loosening up of the sand, and thus allowing it to settle, to be again stirred up by the addition of a new current of water. This is necessary, because the sand separates from the water so rapidly that no amount introduced with it at first would be sufficient to accompany the sand through the whole process of extraction or prevent it from packing in the different stages of the work.

Having thus described our invention, what we claim as new, and desire to secure by Letters Patent, is—

1. The receiving-tank A, with its inclined diaphragm or bottom B, having the discharge-openings E, in combination with the inclined perforated partitions H, substantially as and for the purpose herein described.

2. The receiving-tank A, with its inclined bottom and diaphragms H, and the discharge-opening E, in combination with the water-supply pipe X, arranged to discharge water at the bottom of the tank and near the gate, substantially as and for the purpose herein described.

3. The receiving and distributing tank A, to receive a body of sand with an excess of water, in combination with the tanks F and C and the overflow-passages I and J, by which said excess of water is withdrawn from the upper part of the receiving-tank and separated from the sand, substantially as and for the purpose herein described.

4. The vertical feed-pipe M, having its bottom serrated and immersed in a tank, N, of mercury, as shown, in combination with the screens P and the water-supply pipe Q, to discharge an excess of water into the material above the mercury, substantially as and for the purpose herein described.

5. The mercury-tank N, with its screens P and feed-pipe M from the spout L, as shown, in combination with the sluice R, with its plates S, and the water-supply pipe Q, the whole constructed to operate substantially as and for the purpose herein described.

6. The mercury-tank N, with its feed-pipe M, screens P, and water-supply pipe Q, in combination with the sluice R, with its amalgamated plates S, said plates being formed into a gutter or trough, T, substantially as and for the purpose herein described.

7. The tailings-sluice V, in combination with the sluice R, with its plates S and trough T, and the water-supply pipe W from the tank, substantially as and for the purpose herein described.

In witness whereof we hereunto set our hands and seals.

JOHN H. HOBART. [L. S.]
JOHN T. BEST. [L. S.]

Witnesses:
GEO. H. STRONG,
FRANK A. BROOKS.